United States Patent

Morris, Jr.

[11] Patent Number: 6,045,140
[45] Date of Patent: Apr. 4, 2000

[54] RETENTION GASKET WITH COOPERATING COVER

[75] Inventor: Corydon E. Morris, Jr., Columbus, Ind.

[73] Assignee: Cummins Engine Company, Inc., Columbus, Ind.

[21] Appl. No.: 08/893,841

[22] Filed: Jul. 11, 1997

[51] Int. Cl.[7] .................................................. F16J 15/02
[52] U.S. Cl. ........................................ 277/630; 277/637
[58] Field of Search ................................. 277/598, 596, 277/616, 627, 630, 637, 594

[56] References Cited

U.S. PATENT DOCUMENTS

| | | | |
|---|---|---|---|
| 2,981,247 | 4/1961 | Gaebler . | |
| 3,063,439 | 11/1962 | Kessel . | |
| 3,663,740 | 5/1972 | Dellett . | |
| 3,831,953 | 8/1974 | Leibfritz et al. | 277/637 |
| 4,101,138 | 7/1978 | Gaggiano . | |
| 4,556,106 | 12/1985 | Evans | 277/637 |
| 4,597,583 | 7/1986 | Inciong et al. | 277/637 |
| 4,784,396 | 11/1988 | Scott et al. . | |
| 4,819,953 | 4/1989 | Joh . | |
| 5,022,664 | 6/1991 | Kitada et al. | 277/637 |
| 5,121,933 | 6/1992 | Silvers . | |
| 5,221,097 | 6/1993 | Iskikawa et al. | 277/594 |
| 5,377,643 | 1/1995 | Schibalsky . | |
| 5,529,313 | 6/1996 | Malks | 277/598 |
| 5,662,337 | 9/1997 | Surbrook et al. | 277/594 |
| 5,730,448 | 3/1998 | Swensen et al. | 277/630 |

FOREIGN PATENT DOCUMENTS

| | | | |
|---|---|---|---|
| 0402209 | 12/1990 | European Pat. Off. | C25B 9/00 |
| 687955 | 2/1953 | United Kingdom . | |

*Primary Examiner*—Anthony Knight
*Assistant Examiner*—Karlena D. Schwing
*Attorney, Agent, or Firm*—Woodard, Emhardt, Naughton Moriarty & McNett Patent and Trademark Attorneys

[57] ABSTRACT

A cover assembly for closing off the opening in a panel so as to establish a sealed interface around the opening includes a cover member with a four corners arrangement of clearance holes for attachment of the cover to the panel which also includes a matching pattern of clearance holes. The cover assembly includes a gasket member which is constructed with a carrier and a cooperating edge seal. The carrier includes a substantially planar surface which faces the cover member and extending outwardly from this facing surface are two series of pin-like projections. The cover member is cooperatively arranged with two substantially straight and elongated channels which are constructed and arranged to receive the outwardly extending projections. The two channels act as abutment surfaces for the projections so as to restrict outward or lateral movement of the gasket relative to the cover and panel. At any point when there is internal pressure of sufficient magnitude to deflect the gasket, the protrusions are moved into abutment against the sidewalls of the receiving channels, thereby preventing any further movement of the gasket and preventing blowout.

7 Claims, 3 Drawing Sheets

RETENTION GASKET WITH COOPERATING COVER

BACKGROUND OF THE INVENTION

The present invention relates in general to the sealing of an interface between two components such as a housing and an outer cover where the interior of the housing is at an elevated pressure (above atmospheric). More specifically, the present invention relates to the design of a gasket which includes a molded seal and cooperating carrier. The gasket interfaces with the outer cover so as to prevent blowout of the gasket and loss of the sealed interface which has been established b)y the gasket.

Elastomeric gaskets or seals are commonly used to establish a fluid tight interface between two components which are attached to each other or otherwise assembled such that a leakage path could exist. Typically one component contains a fluid which may or may not be at an elevated pressure. An opening in this one component is closed over by the other component and the two are bolted or in some fashion attached together. Even when the interface between the leakage components and the area surrounding the opening is precisely machined, it is possible for fluid to leak through the interface. The leakage probability increases as the pressure of the fluid within the one component increases. The leakage probability also increases as the distance between attachment points or clumping load points increases.

In certain applications the gasket may include a seal and carrier combination which is sandwiched between the two components. The seal which extends around the opening is compressed by the mechanical attachment of the cover to the housing. The compression of the seal establishes a sealed interface around the opening in the housing and between the two components so as to prevent leakage of the fluid which is contained inside the one component. The attachment of the two components is achieved by the use of threaded fasteners which are typically arranged in a spaced-apart pattern such as at the four corners. The carrier includes a corresponding pattern of clearance holes so that the same fasteners which are used to attach the cover to the housing can be used to secure and position the carrier between the cover and housing.

Depending on the spacing between the threaded fasteners and the pressure of the fluid, it is possible for the gasket to experience what is described as "blowout". If the clamping (pressure) load on the gasket is not sufficient to withstand the internal fluid pressure, the gasket can deflect laterally and blowout from its sealed condition, thereby allowing fluid leakage through the interface between the cover and the housing.

One solution to the blowout concern is to reduce the spacing between the threaded fasteners and/or use a metal plate for the carrier with a relatively high strength and rigidity. By strengthening the carrier and by providing more clamping load points, lateral deflection of the carrier and in turn movement of the seal will likely not occur, even at relatively high interior pressures within the one component (i.e., housing). There are, however, any number of situations where it may not be feasible to add additional threaded fasteners so as to shorten the span between clamping load locations. There are also any number of situations where the use of a plastic material instead of metal for the carrier may be desirable. For example, when there are thermal isolation considerations and/or when lower cost is of interest, the use of plastic for the carrier, as opposed to metal, would be preferred. Typically a plastic material would have less strength than metal and accordingly be more likely to experience lateral deflection and deformation to the point of failure, thereby resulting in leakage at the interface.

In order to prevent blowout of the gasket and still enable the use of a plastic material for the carrier, the present invention has been conceived. The present invention provides a novel and unobvious solution which does not require any change to the mounting hole pattern for the carrier nor for the two components which are joined together, such as a cover and housing. If four corners are used for attachment of the cover to the housing and even if the span between clamping load points between corners is significant, the present invention is unaffected and still provides a sealed interface around the opening in the housing. There are two primary embodiments of the present invention, both of which are suitable to achieve the objectives outlined herein.

Since the use of a gasket to seal around an opening is a relatively old technique, a number of patents have issued over the years which disclose gasket arrangements. The following patents are believed to provide a representative sampling of these earlier gasket designs and concepts:

| PATENT NO. | PATENTEE | ISSUE DATE |
| --- | --- | --- |
| 2,981,247 | Gaebler | Apr. 25, 1961 |
| 3,063,439 | Kessel | Nov. 13, 1962 |
| 3,663,740 | Dellett | May 16, 1972 |
| 4,101,138 | Gaggiano | Jul. 18, 1978 |
| 4,784,396 | Scott et al. | Nov. 15, 1988 |
| 4,819,953 | Joh | Apr. 11, 1989 |
| 5,121,933 | Silvers | Jun. 16, 1992 |
| 5,221,097 | Ishikawa et al. | Jun. 22, 1993 |
| 5,377,643 | Schibalsky | Jan. 3, 1995 |

While a variety of gaskets are disclosed by these listed patents, the key features of the present invention are not envisioned.

SUMMARY OF THE INVENTION

A cover assembly which is constructed and arranged for closing across an opening in a panel so as to establish a sealed interface according to one embodiment of the present invention comprises a cover member including an arrangement of fasteners and clearance holes for securing the cover to the panel, a gasket member which is constructed and arranged to be positioned between the cover member and the panel, the gasket member including a carrier and a cooperating seal, the carrier having a substantial planar cover member-facing surface and being constructed and arranged with a plurality of projections outwardly extending in a direction which is substantially perpendicular to the cover member-facing surface and the cover member being constructed and arranged with a plurality of projection-receiving recesses, each of which is positioned so as to receive at least one of the projections.

One object of the present invention is to provide an improved cover assembly for closing across and sealing around an opening in a panel.

Related objects and advantages of the present invention will be apparent from the following description.

DESCRIPTION OF THE PREFERRED EMBODIMENT

Figure 1:
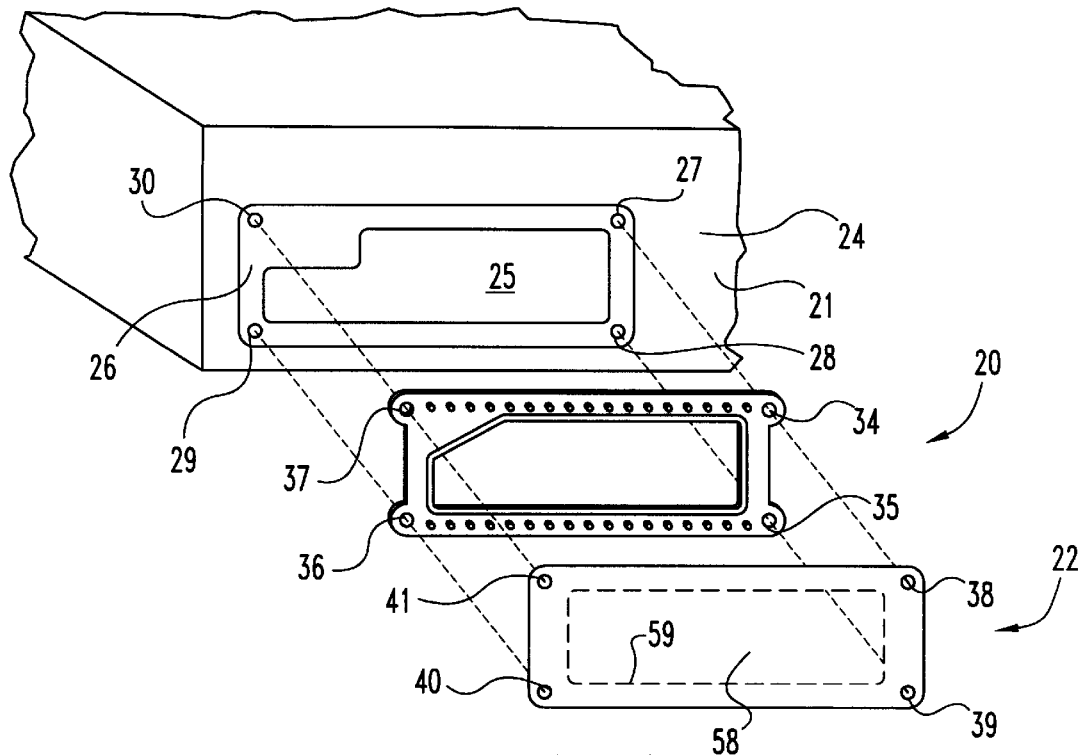
FIG. 1 is, an exploded view of a cover assembly for attachment to a panel according to a typical embodiment of the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, such alterations and further modifications in the illustrated device, and such further applications of the principles of the invention as illustrated therein being contemplated as would normally occur to one skilled in the art to which the invention relates.

Referring to FIG. 1, a cover assembly according to the present invention is shown. The cover assembly includes a gasket 20 which is to be placed up against housing 21 and a cooperating cover 22 which is to be attached to housing 21 so as to secure and sandwich gasket 20 therebetween. The exploded view of FIG. 1 shows that housing 21 is a hollow unit with a front wall 24 which includes opening 25. Panel 26 may be used to reinforce the front wall 24 and/or define the shape of opening 25. The four clearance holes 27 through 30 which are present in panel 26 and wall 24 are designed to receive threaded fasteners which clamp together the cover 22 and gasket 20 against panel 26. The interior of housing 21 is designed to receive a fluid at an elevated pressure. Accordingly, there is a possibility for the fluid to leak out from between the panel 26 and the cover 22, but for the presence of gasket 20 which is clamped between the cover 22 and panel 26. The four clearance holes 34 through 37 which are disposed in gasket 20 and the four clearance holes 38 through 41 which are disposed in cover 22 have the same four corners spacing relative to each other and the same four corners spacing with regard to the four clearance holes in panel 26. In the preferred embodiment, the housing 21 represents an intake manifold and thus the interior fluid is air.

Figure 2:
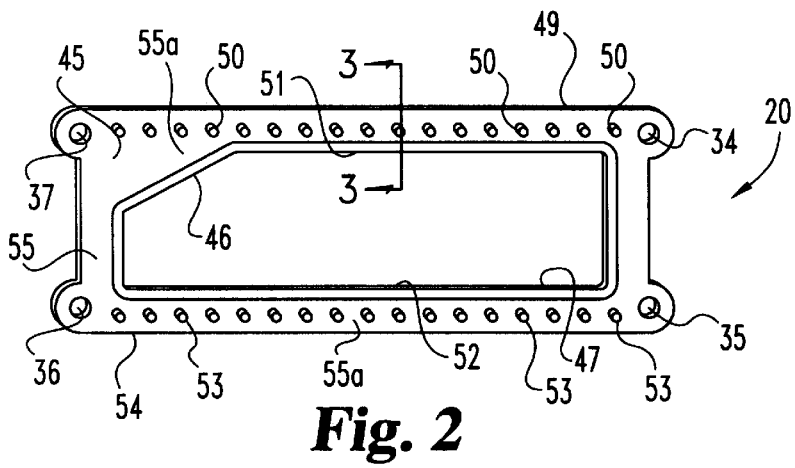
FIG. 2 is a perspective view of the gasket which comprises a portion of the FIG. 1 cover assembly.
Figure 3:
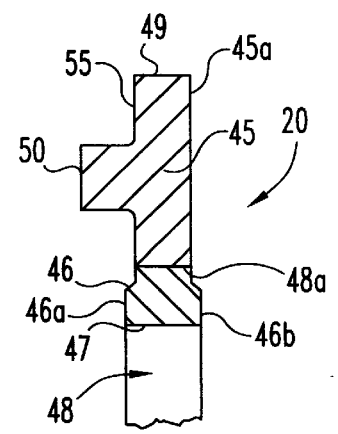
FIG. 3 is a side elevational view in full section of the FIG. 2 gasket as viewed along line 3—3 in FIG. 2.

Referring now to FIGS. 2 and 3, the details of gasket 20 are illustrated. Gasket 20 includes a molded plastic carrier 45 and a molded rubber seal 46. The seal 46 is integrally bonded to the plastic cover 45. The seal 46 extends around and is uniformly arranged relative to edge 47 of opening 48. Opening 48 includes an outer boundary 48a which is defined by the coincident inner edge of carrier 45. Seal 46 is attached to this coincident inner edge of carrier 45. Opening 48 is sized and arranged to extend completely around opening 25 without any edge overlap so that seal 46 extends completely around and outboard of opening 25. Seal 46 is placed in contact against panel 26 such that there is a sealed perimeter completely encircling opening 25. The section view of FIG. 3 provides an illustration of the position and thickness of seal 46 relative to carrier 45. Carrier 45 includes surface 55 and surface 45a. Seal 46 has an increased thickness relative to carrier 45 such that surface 46a extends beyond surface 55 in the direction of cover 22. Seal 46 also includes surface 46b which extends beyond surface 45a in the direction of panel 26. The increased thickness of the seal is provided so that it can be compressed between the cover and panel 26 in order to establish the required leak-tight interface. Some degree of seal compression could not be assumed if the thickness of the seal 46 was the same as that of the carrier 45.

Positioned between the top edge 49 of carrier 45 and seal 46 are twelve pin-like protrusions 50 which are each securely anchored into carrier 45 and which extend in a substantially straight line which is substantially parallel with top edge 49 and with opening edges 51 and 52. The twelve protrusions 50 are equally spaced apart from one another and extend between the two upper points of attachment or clamping load locations represented by clearance holes 34 and 37. A second series of twelve pin-like protrusions 53 are positioned between lower edge 54 and seal 46. Each of these twelve protrusions 53 are securely anchored into carrier 45 and extend in a substantially straight line which is substantially parallel with lower edge 54 and with opening edges 51 and 52. These twelve protrusions 53 are equally spaced apart and have a spacing which is substantially the same as that of protrusions 50. in a similar fashion, the twelve protrusions 53 are positioned between the two attachment points or clamping locations represented by clearance holes 35 and 36. Protrusions 50 and 53 are preferably integrally molded as part of carrier 45 as a unitary unit. Alternatively, the two sets of twelve protrusions which are each substantially cylindrical pins may be adhesively bonded into drilled holes prepared in carrier 45. Another option would be to use threaded engagement between the protrusions and the carrier.

The surface 55 of gasket 20 which faces the cover 22 includes a portion 55a which is substantially planar and away from which the two sets of protrusions 50 and 53 extend. Each protrusion is substantially cylindrical with a longitudinal axis that is substantially perpendicular to portion 55a of cover-facing surface 55. The objective of the design is to have two sets of protrusions securely anchored within the carrier which are used to stop any lateral deflection of the gasket relative to the cover and panel. The degree of stoppage of any deflection must be sufficient to prevent blowout of the gasket. Accordingly, while some slight deflection might still be possible based on the dimensions and tolerances, the function of the protrusions 50 and 53 is to provide a means of abutment with the cooperating cover so that lateral movement of the gasket sufficient to create a break in the sealed interface will not occur.

Figure 4:
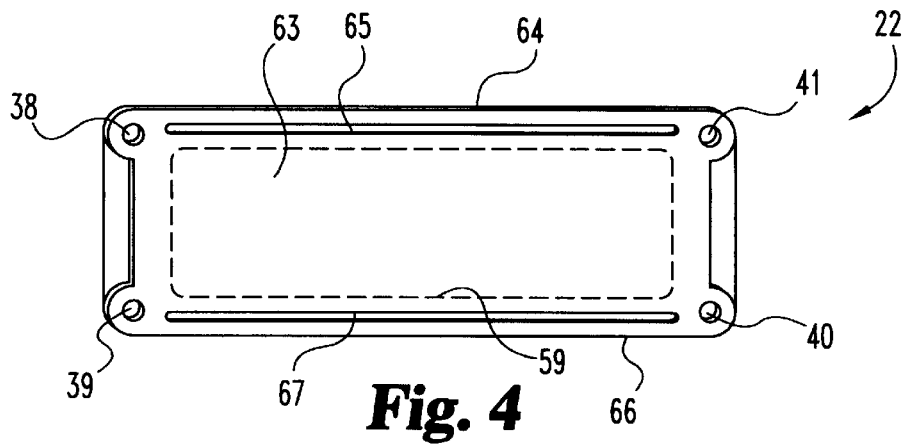
FIG. 4 is a perspective view of the cover member of the FIG. 1 cover assembly.

Referring now to FIG. 4, the outer cover 22 is illustrated in greater detail. In the FIG. 1 illustration, the outer surface 58 is shown as smooth and substantially flat and the broken line outline 59 is intended to represent or suggest that the actual style of the cover can vary and in fact take or a number of different configurations depending on the specific application. In the illustrated example of FIG. 1, the housing 21 represents an intake manifold of a diesel engine.

Cover 22 includes an outer surface 58 and opposite thereto a substantially flat and smooth gasket-facing surface 63. The outer peripheral edge of cover 22 includes an upper edge 64 and extending parallel to upper edge 64 between clearance holes 38 and 41 a protrusion-receiving, elongate channel 65. The gasket-facing surface 63 also includes a lower edge 66 and defines a second protrusion-receiving, elongate channel 67 which runs in a direction substantially parallel with lower edge 66 between clearance holes 39 and 40. Based on part symmetry which would be assumed, the dimensional spacing between clearance holes 38 and 39 is substantially the same as between clearance holes 40 and 41. Likewise the dimensional spacing between clearance holes 38 and 41 is substantially the same as the spacing between clearance holes 39 and 40. Channel 65, while substantially parallel with upper edge 64 and positioned between clearance holes 38 and 41, is not on the axis line between clearance holes 38 and 41, but is slightly shifted off of that axis line in the direction of upper edge 64. Channel 65 has a depth which substantially coincides with the length of the twelve protrusions 50 which are designed to fit within channel 65. The depth of channel 65 should be slightly greater than the maximum length or protruding length of the protrusions 50 so that the gasket-facing surface 63 will be able to abut flush up against the cover-facing surface 55. As is illustrated, the two sets of twelve protrusions each extend away from surface 68 and are substantially perpendicular to that surface.

With a similar design, the lower channel 67, which is also substantially parallel to lower edge 66 and which extends between clearance holes 39 and 40, is slightly shifted off of the clearance hole axis line in the direction of lower edge 66. Here again, channel 67 has a size and depth which is designed to receive the lower set of twelve protrusions 53 without allowing the tips of those protrusions to bottom out on the base of channel 67. The length of channels 65 and 67 are designed to accommodate the number and span of the two sets of protrusions. While twelve protrusions are illustrated in the preferred embodiment, this number can be increased or decreased depending on the size of the gasket and cover and the distance between the attachment points or points where a clamping load is applied.

As has been described, each protrusion of the two sets of protrusions 50 and 53 has an outside diameter size which is substantially equal to the width of channels 65 arid 67 so that there is a close fit of the protrusions within their corresponding protrusion-receiving channels 65 and 67. Whenever the internal pressure reaches a point which might otherwise cause the gasket to laterally deflect, this will cause the protrusions to move laterally within their corresponding channel and almost immediately abut up against the side walls of the channels which are closest to the outer edges of the cover. It is the sidewalls of these channels 65 and 67 which prevent any further movement of the gasket, thereby preventing blowout. Obviously, one would want to size and tolerance the protrusions and the channels so that there is a minimum amount of movement permitted by the gasket so as to preclude any break in the sealed interface which might result in leakage.

Figure 5:
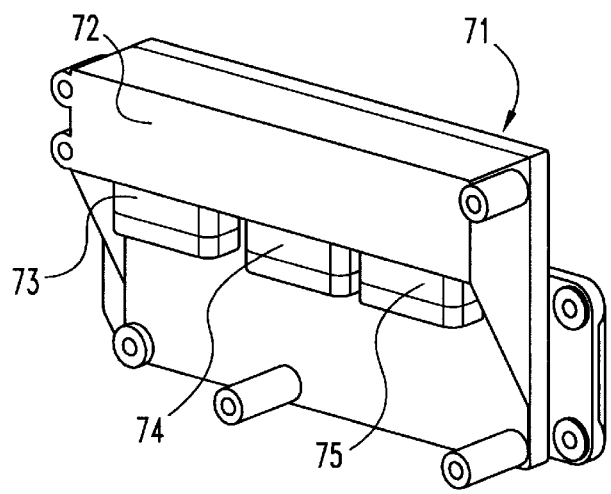
FIG. 5 is a perspective view of an alternative cover member which is suitable for use as part of the FIG. 1 cover assembly.
Figure 6:
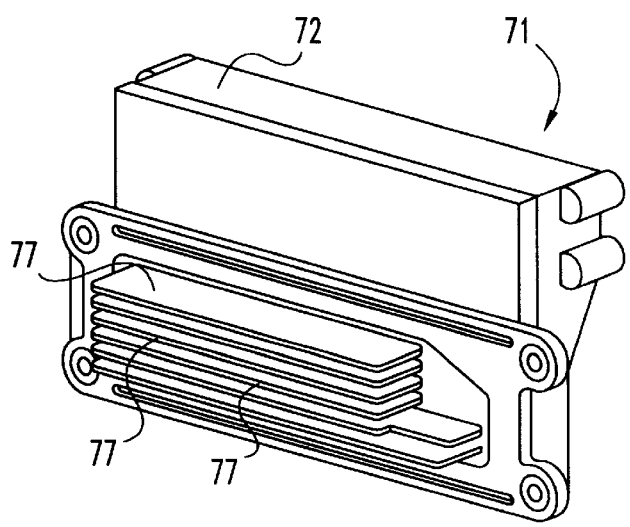
FIG. 6, is a perspective view of the opposite side of the FIG. 5 alternative cover member.

One style of cover which is contemplated and illustrated in FIGS. 5 and 6 is a cover 71 which incorporates a compartment 72 and in the interior of the compartment an engine control module (ECM) which is not shown. The three multi-pin connectors 73, 74, and 75 provide an electrical connection interface to the ECM. The opposite side of the cover which faces the opening 25 and the interior of the intake manifold is arranged with a series of heat sink fins 77. The individual fins extend through opening 25 into the air stream inside of the intake manifold.

Figure 7:
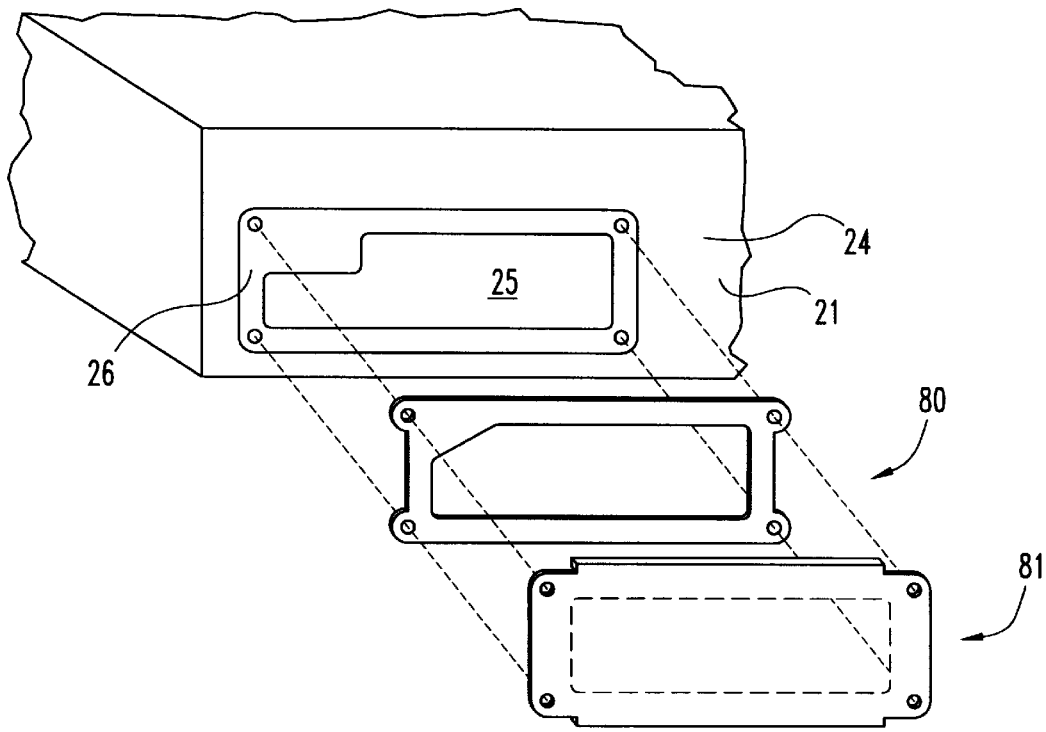
FIG. 7 is an exploded view of an alternative cover assembly according to another embodiment of the present invention.
Figure 8:
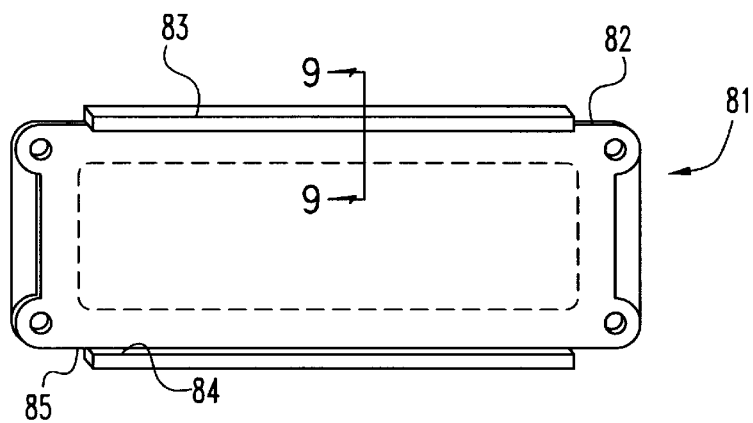
FIG. 8 is a perspective view of the cover member which comprises a portion of the FIG. 7 cover assembly.
Figure 9:
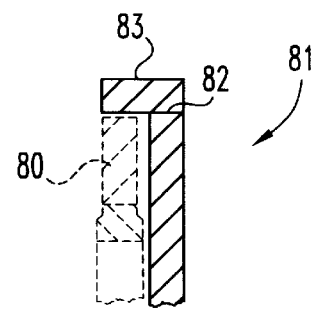
FIG. 9 is a side elevational view in full section as viewed along lines 9—9 in FIG. 8 and with the gasket member of the FIG. 7 cover assembly added in broken line form.

With reference to FIG. 7, an alternative to the gasket 20 design of FIG. 1 is illustrated. Gasket 80 is identical to gasket 20 with the exception that the two sets of twelve protrusions 50 and 53 of gasket 20 are eliminated. In order to retain the gasket and prevent gasket blowout, the cover 81 (see FIGS. 8 and 9) is arranged along its upper edge 82 with an inwardly- directed, elongated lip 83. A similar lip 84 is disposed along the lower edge 85 of cover 81. By arranging the two lips to extend toward the gasket and overhang the edges of the gasket, the two lips 83 and 84 function as retainers to restrict any outward movement of the gasket. Any time the gasket would tend to move in an outward or lateral direction such that the sealed interface might be lost, the gasket abuts up against the corresponding lip which prevents any further movement of the gasket. As explained previously, the anticipated movement of the gasket is in a direction which is parallel with the plane of the gasket and of the cover. This lateral movement which can be caused by the pressure levels inside of the corresponding housing needs to be restricted so that the sealed interface is not lost.

The two lips 83 and 84 can be molded as part of cover 81 or these two lips can be separately fabricated as component parts which are then securely attached to the corresponding edges of the cover. Attachment by a suitable adhesive is one option. The use of threaded fasteners is another option.

Although the invention description generally refers to the situation where the interior of the housing is at an elevated pressure (above atmospheric), it should be understood that the invention applies to any other combination of pressures whereby the pressure on the inside of the gasket can be higher or lower than the pressure on the outside of the gasket as long as the gasket features and mating cover features are designed to provide resistance to the pressure forces in the appropriate direction.

While the invention has been illustrated and described in detail in the drawings and foregoing description, the same is to be considered as illustrative and not restrictive in character, it being understood that only the preferred embodiment has been shown and described and that all changes and modifications that come within the spirit of the invention are desired to be protected.

What is claimed is:

1. A cover assembly which is constructed and arranged for closing over an opening in a panel front wall so as to establish a sealed interface against said panel front wall around said opening, said cover assembly comprising:

a cover member including attachment means for securing the cover member to said panel front wall;

a gasket member which is constructed and arranged to be positioned between the cover member and the panel front wall, said gasket member including a carrier and a cooperating seal, said carrier having a substantially planar, cover member-facing surface and a panel front wall-facing surface, said cover member-facing surface being constructed and arranged with a plurality of outwardly-extending projections, said carrier defining an opening which is sized and shaped to extend completely around the opening in said panel front wall;

said cooperating seal being attached to said carrier adjacent to said opening, said cooperating seal having a first surface which extends beyond said cover-facing surface in the direction of said cover and having a second surface which extends beyond said panel front wall-facing surface in the direction of said panel front wall; and said cover member being constructed and arranged with a plurality of projection-receiving recesses each of which is positioned so as to receive at least one of said outwardly-extending projections.

2. A cover assembly which is constructed and arranged for closing over an opening in a panel front wall so as to establish a sealed interface against said panel front wall around said opening, said cover assembly comprising:

a cover member including a plurality of spaced-apart attachment means for securing the cover member to said panel front wall;

a gasket member including a plurality of spaced-apart mounting means which are aligned with said attachment means for securing the gasket member between the cover member and said panel front wall, said gasket member including a carrier and a cooperating seal, said carrier having a substantially planar, cover member-facing surface and being constructed and arranged with a first plurality of outwardly-extending projections, and with a second plurality of outwardly-extending projections, said first plurality of outwardly-extending projections being arranged in a substantially straight line between a first one and a second one of said mounting means and said second plurality of outwardly-extending projections being arranged in a substantially straight line between a third one and a fourth one of said mounting means.

3. In combination:

a housing having an interior which is designed to accommodate an elevated pressure, said housing including a front wall which defines an opening having an outer periphery; and a cover assembly which is constructed and arranged for enclosing said interior by establishing a sealed interface against said front wall around the outer periphery of said opening, said cover assembly comprising:

a cover member including attachment means for securing the cover member to said front wall;

a gasket member which is constructed and arranged to be positioned between the cover member and the front wall, the gasket member including a carrier and a cooperating seal, said carrier having a substantially planar, cover member-facing surface and a front wall-facing surface, said cover member-facing surface being constructed and arranged with a plurality of outwardly-extending projections, said carrier defining an opening which is sized and shaped to extend completely around the opening in said front wall;

said cooperating seal being attached to said carrier adjacent to said opening, said cooperating seal having a first surface which extends beyond said cover-facing surface in the direction of said cover and having a second surface which extends beyond said front wall-facing surface in the direction of said front wall; and said cover member being constructed and arranged with a plurality of projection-receiving recesses each of which is positioned so as to receive at least one of said outwardly-extending projections.

4. In combination:

a housing having an interior which is designed to accommodate an elevated pressure, said housing including a front wall which defines an opening having an outer periphery; and a cover assembly which is constructed and arranged for enclosing said interior by establishing a sealed interface against said front wall around the outer periphery of said opening, said cover assembly comprising:

a cover member including a plurality of spaced-apart attachment means for securing the cover member to said front wall;

a gasket member including a plurality of spaced-apart mounting means which are aligned with said attachment means for securing the gasket member between the cover member and said front wall, said gasket member including a carrier and a cooperating seal, said carrier having a substantially planar, cover member-facing surface and being constructed and arranged with a first plurality of outwardly-extending projections and with a second plurality of outwardly-extending projections, said first plurality of outwardly-extending projections being arranged in a substantially straight line between a first one and a second one of said mounting means and said second plurality of outwardly-extending projections being arranged in a substantially straight line between a third one and a fourth one of said mounting means.

5. A cover assembly which is constructed and arranged for closing over an opening in a panel front wall so as to establish a sealed interface against said panel front wall around said opening, said cover assembly comprising:

a cover member including attachment means for securing the cover member to said panel front wall;

a gasket member which is constructed and arranged to be positioned between the cover member and the panel front wall, the gasket member including a carrier and a cooperating seal, said carrier having a substantially planar, cover member-facing surface and being constructed and arranged with a plurality of outwardly-extending projections, said carrier further defining a clearance opening which is constructed and arranged for alignment with the opening in said panel front wall, said clearance opening being defined by a first edge of said carrier and on an opposite side of said clearance opening by a second edge of said carrier, a plurality of said outwardly-extending projections being positioned adjacent said first edge and a plurality of said outwardly-extending projections being positioned adjacent said second edge; and said cover member being constructed and arranged with a total of two projection-receiving recesses, each of which is constructed and arranged as a substantially straight and elongate channel and each of which is constructed and arranged so as to receive at least one of said outwardly-extending projections.

6. A cover assembly which is constructed and arranged for closing over an opening in a panel front wall so as to establish a sealed interface against said panel front wall around said opening, said cover assembly comprising:

a cover member including a plurality of spaced-apart attachment means for securing the cover member to said panel front wall;

a gasket member including a plurality of spaced-apart mounting means which are aligned with said attachment means for securing the gasket member between the cover member and said panel front wall, said gasket member including a carrier and a cooperating seal, said carrier having a substantially planar, cover member-facing surface and being constructed and arranged with a plurality of outwardly-extending projections, said carrier further defining a clearance opening which is substantially aligned with the opening in said panel front wall, said clearance opening including a first edge and on the opposite side of said clearance opening a second edge wherein a plurality of said outwardly-extending projections being positioned adjacent said first edge and a plurality of said outwardly-extending projections being positioned adjacent said second edge;

said cover member being constructed and arranged with a total of two projection-receiving recesses, each of which is constructed and arranged as a substantially straight and elongate channel and each of which is constructed and arranged so as to receive at least one of said outwardly-extending projections; and at least one of said outwardly-extending projections being positioned between a first one and a second one of said mounting means and at least one of said outwardly-extending projections being positioned between a third one and a fourth one of said mounting means.

7. A cover assembly which is constructed and arranged for closing over an opening in a panel front wall so as to establish a sealed interface against said panel front wall around said opening, said cover assembly comprising:

a cover member including attachment means for securing the cover member to said panel front wall;

a gasket member which is constructed and arranged to be positioned between the cover member and the panel front wall, the gasket member including a carrier and a cooperating seal;

said carrier having a substantially planar, cover member-facing surface and being constructed and arranged with a plurality of outwardly-extending projections, and an inner edge of said carrier defining an opening, said seal being attached to said inner edge; and said cover member being constructed and arranged with a plurality of projection-receiving recesses each of which is positioned so as to receive at least one of said outwardly-extending projections.

* * * * *

UNITED STATES PATENT AND TRADEMARK OFFICE
CERTIFICATE OF CORRECTION

PATENT NO.    : 6,045,140
DATED         : April 4, 2000
INVENTOR(S)   : Corydon E. Morris, Jr.

It is certified that error appears in the above-identified patent and that said Letters Patent is hereby corrected as shown below:

Column 1:
Line 13, replace "b)y with --by--.

Column 4:
Line 62, replace "or" with --on--.

Column 5:
Line 23, delete ":".
Line 43, replace "arid" with --and--.

Signed and Sealed this

Nineteenth Day of June, 2001

*Attest:*

*Attesting Officer*

NICHOLAS P. GODICI
*Acting Director of the United States Patent and Trademark Office*